US010334215B2

(12) United States Patent
Bostick et al.

(10) Patent No.: US 10,334,215 B2
(45) Date of Patent: Jun. 25, 2019

(54) PROJECTING OBSTRUCTED CONTENT OVER TOUCH SCREEN OBSTRUCTIONS

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/982,391

(22) Filed: May 17, 2018

(65) Prior Publication Data
US 2018/0324397 A1 Nov. 8, 2018

Related U.S. Application Data

(63) Continuation of application No. 15/589,154, filed on May 8, 2017, now Pat. No. 10,033,978.

(51) Int. Cl.
*H04N 9/31* (2006.01)
*H04W 76/10* (2018.01)
(Continued)

(52) U.S. Cl.
CPC .......... *H04N 9/3179* (2013.01); *G06F 3/042* (2013.01); *G06F 3/0488* (2013.01);
(Continued)

(58) Field of Classification Search
CPC .. H04N 9/3179; H04N 9/3173; H04N 9/3194; H04W 76/10; G06F 3/012; G06F 3/042
(Continued)

(56) References Cited

U.S. PATENT DOCUMENTS 6,943,774 B2 9/2005 Horiki
8,519,971 B1 8/2013 Mackraz
(Continued)

FOREIGN PATENT DOCUMENTS

EP 2541386 1/2013

OTHER PUBLICATIONS

"List of IBM Patents or Patent Applications Treated as Related," 1 page.
(Continued)

*Primary Examiner* — Michael Lee
(74) *Attorney, Agent, or Firm* — Brian Restauro; Andrew D. Wright; Roberts Mlotkowski Safran Cole & Calderon, P.C.

(57) ABSTRACT

Systems and methods for detecting and projecting obstructed content over touch screen obstructions are disclosed. In embodiments, a computer-implemented method, includes: displaying, by a computing device, content on a touch screen of the computing device; detecting, by the computing device, an obstruction of the content on one or more areas of the touch screen; determining, by the computing device, obstructed content in the one or more areas; determining, by the computing device, a display configuration for a portion of the obstructed content, wherein the display configuration defines a manner in which the portion of the obstructed content is to be projected by at least one wearable projector device; and sending, by the computing device, the display configuration to the at least one wearable projector device adapted to project the portion of the obstructed content over at least one object causing the obstruction of the content.

20 Claims, 4 Drawing Sheets

(51) Int. Cl.
*G06F 3/0488* (2013.01)
*G06F 3/042* (2006.01)

(52) U.S. Cl.
CPC ......... *H04N 9/3173* (2013.01); *H04N 9/3194* (2013.01); *H04W 76/10* (2018.02)

(58) Field of Classification Search
USPC ........................................................ 348/576
See application file for complete search history.

(56) References Cited

U.S. PATENT DOCUMENTS

| | | | |
|---|---|---|---|
| 10,033,978 B1 * | 7/2018 | Bostick | H04W 76/10 |
| 2004/0032398 A1 | 2/2004 | Ariel et al. | |
| 2008/0204557 A1 | 8/2008 | Kubota et al. | |
| 2009/0086019 A1 | 4/2009 | Okabe et al. | |
| 2009/0254855 A1 | 10/2009 | Kretz et al. | |
| 2009/0295712 A1 | 12/2009 | Ritzau et al. | |
| 2010/0199232 A1 | 8/2010 | Mistry et al. | |
| 2011/0307842 A1 | 12/2011 | Chiang et al. | |
| 2012/0249409 A1 * | 10/2012 | Toney | G06F 3/017 345/156 |
| 2013/0322785 A1 * | 12/2013 | Kamamori | G06F 3/0484 382/311 |
| 2013/0328766 A1 * | 12/2013 | Igarashi | G06F 3/017 345/156 |
| 2014/0055352 A1 | 2/2014 | Davis et al. | |
| 2015/0143276 A1 | 5/2015 | Luo | |
| 2015/0341606 A1 * | 11/2015 | Xu | H04N 9/3173 353/119 |
| 2015/0363038 A1 | 12/2015 | Luo | |

OTHER PUBLICATIONS

List of IBM Patents or Patent Applications Treated as Related, dated Apr. 17, 2019, 1 page.

Specification "Projecting Obstructed Content Over Touch Screen Obstructions" and Drawings in U.S. Appl. No. 16/380,198 filed Apr. 10, 2019, 32 pages.

* cited by examiner

PROJECTING OBSTRUCTED CONTENT OVER TOUCH SCREEN OBSTRUCTIONS

BACKGROUND

The present invention relates generally to display systems and, more particularly, to detecting and projecting obstructed content over touch screen obstructions.

Touch screens of various configurations have been increasingly utilized in business and private settings. Some devices that typically employ touch screen technology include smart phones, smart watches, laptop computers, tablet computers, desktop computers and smart televisions. Touch screens may be utilized with software allowing users to reformat, drag, and/or drop content displayed on the touch screen using their fingers or a stylus. Some devices have been developed with projected screens and sensors instead of touch pads. Finding ways to enhance a user's experience when interacting with touch screen devices or projected screen devices continues to be a goal of developers.

SUMMARY

In an aspect of the invention, a computer-implemented method includes: displaying, by a computing device, content on a touch screen of the computing device; detecting, by the computing device, an obstruction of the content on one or more areas of the touch screen; determining, by the computing device, obstructed content in the one or more areas; determining, by the computing device, a display configuration for a portion of the obstructed content, wherein the display configuration defines a manner in which the portion of the obstructed content is to be projected by at least one wearable projector device; and sending, by the computing device, the display configuration to the at least one wearable projector device adapted to project the portion of the obstructed content over at least one object causing the obstruction of the content.

In another aspect of the invention, there is a computer program product for detecting and projecting obstructed content over touch screen obstructions. The computer program product includes a computer readable storage medium having program instructions embodied therewith. The program instructions are executable by a computing device to cause the computing device to: display content on a touch screen of the computing device; pair the computing device with a wearable projector device; detect, in real time, an obstruction of the content on an area of the touch screen by an obstructing object; determine obstructed content in the area of the touch screen; determine a display configuration for a portion of the obstructed content, wherein the display configuration defines a manner in which the portion of the obstructed content is to be projected by the wearable projector device; and send the display configuration to the wearable projector device, wherein the wearable projector device is adapted to project the portion of the obstructed content over the obstructing object.

In another aspect of the invention, there is a system for detecting and projecting obstructed content over touch screen obstructions. The system includes: a CPU, a computer readable memory and a computer readable storage medium associated with a computing device; program instructions to receive content display rules; program instructions to display content on a touch screen of the computing device; program instructions to pair the computing device with a wearable projector device; program instructions to detect, in real time, an obstruction of the content on an area of the touch screen by an obstructing object; program instructions to determine obstructed content in the area of the touch screen; program instructions to determine a display configuration for a portion of the obstructed content using the content display rules, wherein the display configuration defines a manner in which the portion of the obstructed content is to be projected by the wearable projector device; and program instructions to send the display configuration to the wearable projector device, wherein the wearable projector device is adapted to project the portion of the obstructed content over the obstructing object, wherein the program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
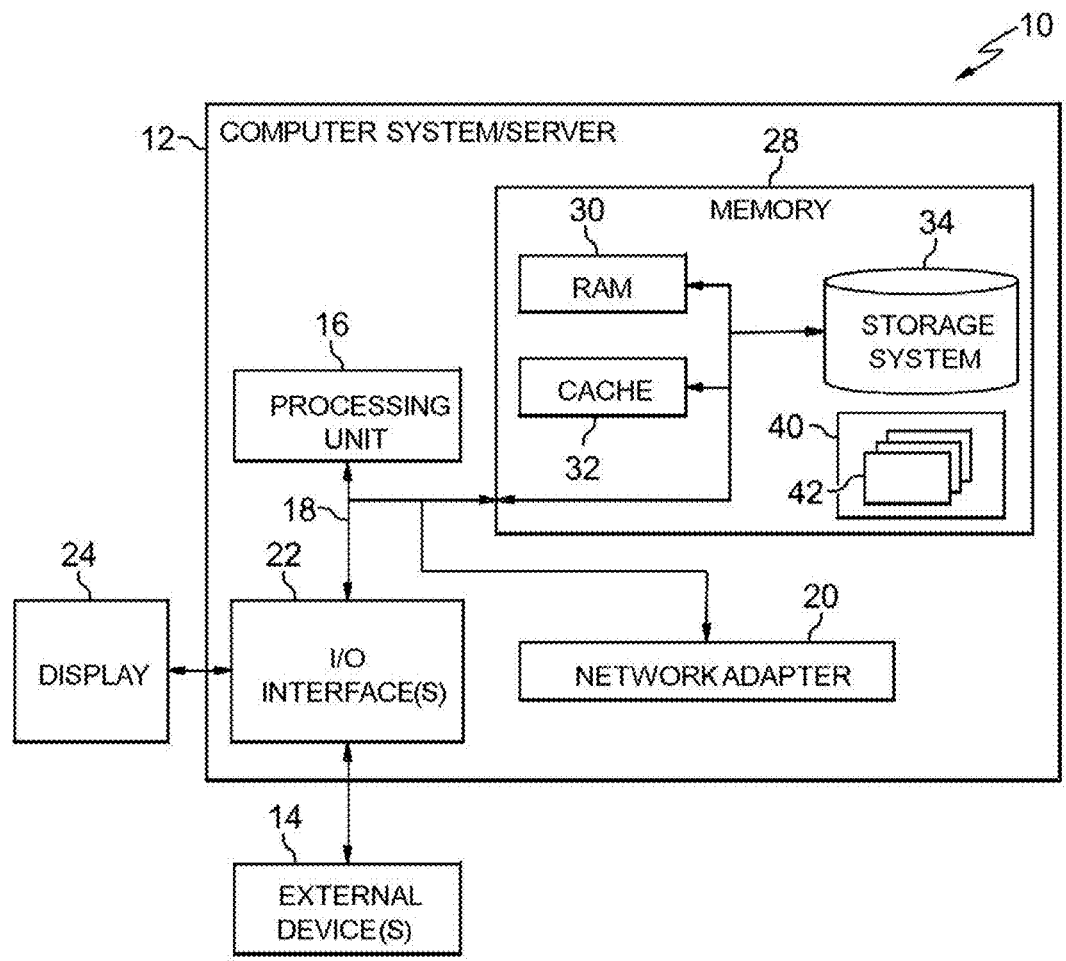
FIG. 1 depicts a computing infrastructure according to an embodiment of the present invention.

The present invention relates generally to display systems and, more particularly, to detecting and projecting obstructed content over touch screen obstructions. In embodiments, a method is provided for detecting an obstacle to viewing content on a touch screen device created by a user's finger as they interact with the device. The method further comprises projecting obstructed content on top of the user's finger from a paired wearable device (e.g., ring, watch, glasses) with a pico image projector to allow the operating user or other users to visualize the obstructed content.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
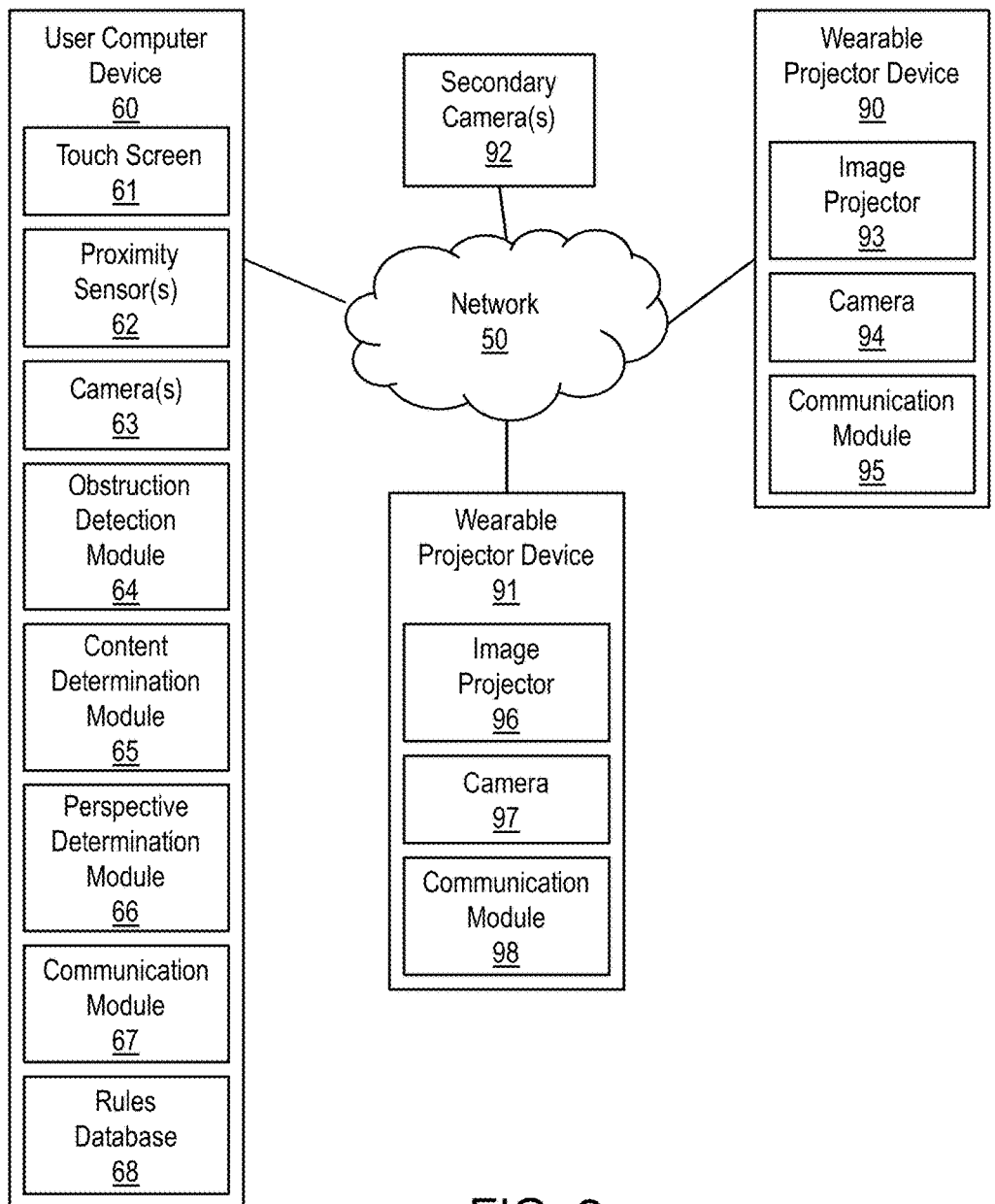
FIG. 2 shows an exemplary environment in accordance with aspects of the invention.

FIG. 2 shows an exemplary environment in accordance with aspects of the invention. The environment includes user computer device 60 connected to a network 50. The user computer device 60 may comprise a computer system 12 of FIG. 1, and may be connected to the network 50 via the network adapter 20 of FIG. 1. The user computer device 60 may be a desktop computer, laptop computer, tablet computer, smartphone, etc. In embodiments, the user computer device 60 includes one or more of the following: touch screen 61, one or more proximity sensors 62 and one or more cameras 63.

Still referring to FIG. 2, the user computer device 60 may include a number of program modules configured to perform one or more of the functions described herein, such as an obstruction detection module 64, a content determination module 65, a perspective determination module 66, and a communication module 67. Each of modules 64-67 may comprise one or more program modules (e.g., program module 42 of FIG. 1) executed by the user computer device 60. In embodiments, the obstruction detection module 64 is configured to detect an obstruction of content displayed on the touch screen 61. In aspects, the content determination module 65 is configured to determine obstructed content in one or more areas, and determine a display configuration for a portion of the obstructed content (i.e., all or some of the obstructed content). In aspects, the content determination module 65 determines a display configuration based on content display rules stored in a rules database 68. In embodiments, the perspective determination module 66 is configured to determine a facial direction of one or more users relative to the touch screen 61. In aspects, the communication module 67 is configured to communicate over the network 50 with one or more wearable projector devices 90, 91 and any secondary cameras 92 utilized in the invention.

The network 50 may be any suitable communication network or combination of networks, such as a local area network (LAN), a general wide area network (WAN), and/or a public network (e.g., the Internet). In embodiments, the network 50 is a Bluetooth network and the user computer device 60 is in communication with one or more wearable image projectors (represented by the wearable projector devices 90 and 91) via the network 50. In embodiments, the wearable projector device 90 is in the form of a ring, a bracelet, a smartwatch, smart glasses, or other wearable computer device. The wearable projector device 90 may include one or more image projectors 93 (e.g., micro projectors or pico projectors), a camera 94 and a communication module 95. Likewise, the wearable projector device 91 may include one or more image projectors 96 (e.g., micro projector or pico projector), a camera 97 and a communication module 98. In embodiments, each of the communication modules 95 and 98 may comprise one or more program modules executable by respective wearable projector devices 90 and 91, and configured to receive display configuration data from the user computer device 60 (e.g., from communications module 67) via the network 50.

It should be understood that the quantity of devices and/or networks in the environment of FIG. 2 is not limited to what is shown in FIG. 2. In practice, the environment of FIG. 2 may include additional devices and/or networks; fewer devices and/or networks; different devices and/or networks; or differently arranged devices and/or networks.

Figure 3:
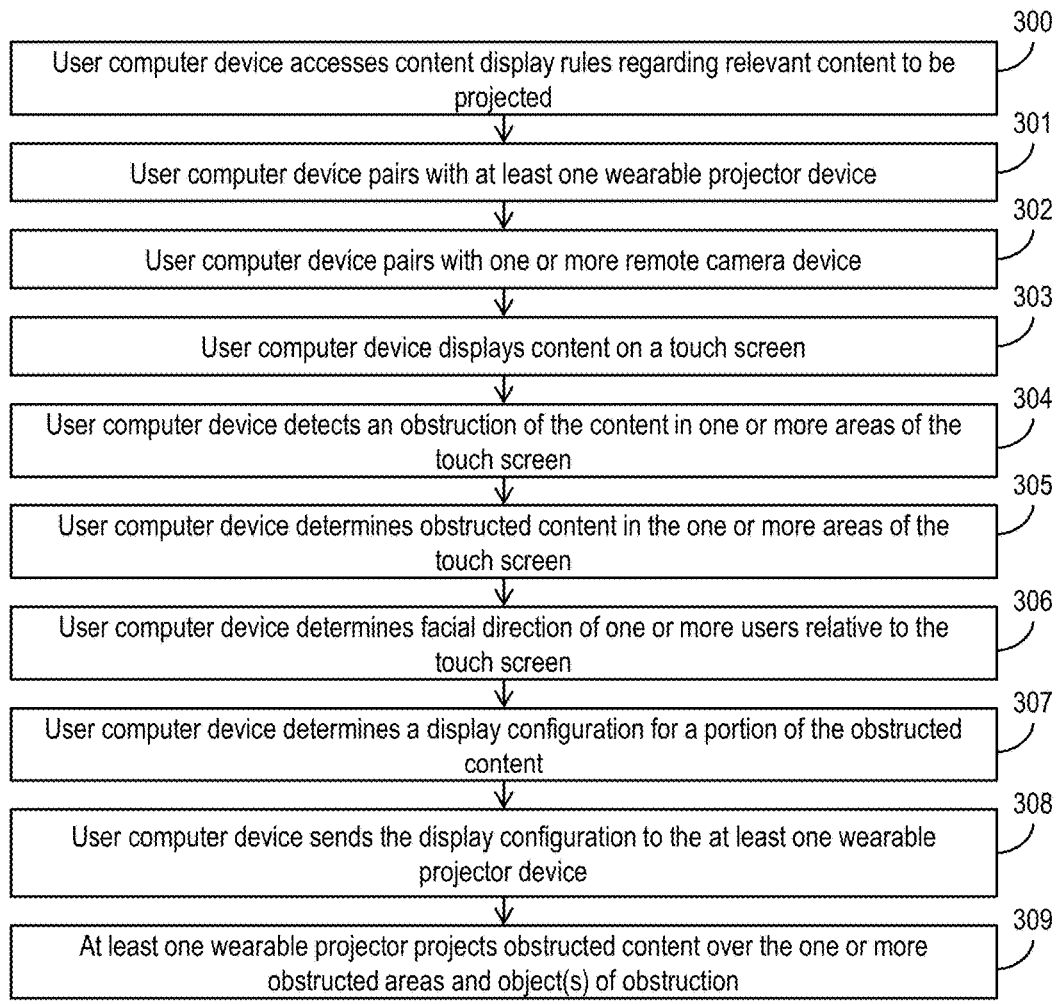
FIG. 3 shows a flowchart of steps of a method in accordance with aspects of the invention.

FIG. 3 shows a flowchart of a method in accordance with aspects of the invention. Steps of the method of FIG. 3 may be performed in the environment illustrated in FIG. 2, and are described with reference to elements shown in FIG. 2.

In embodiments, at step 300, the user computer device 60 accesses content display rules regarding relevant content to be projected. In aspects, the content determination module 65 accesses the content display rules stored in the rules database 68 of the user computer device 60. In embodiments, the user computer device receives rules from a remote device (not shown), such as a third party service provider (e.g., support services for the wearable projectors 90, 91) or directly from a user through a user interface of the user computer device 60, and stores the rules in a rules database 68 of the user computer device 60. In aspects, the user computer device 60 presents display rule configuration options or queries to a user, and the user's selection of the option or answers to the query determine the content display rules. In other embodiments, the user computer device accesses content display rules in a remote database (not shown), such as a database of a third party service provider, via the network 55. The content display rules may include rules regarding the type or category of content to be projected by one or more of the wearable projector devices 90, 91. For example, it may not be necessary or desirable to project certain types of content, such as decorative borders or the like. In embodiments, the content display rules comprise rules to only project text-based content.

At step 301, the user computer device 60 pairs with at least one wearable projector device 90, 91. In embodiments, the communication module 67 of the user computer device 60 includes Bluetooth technology to pair with the communication module 95, 98 of one or more wearable projector devices 90, 91. In aspects, the user computer device 60 pairs with the wearable projector device 90 of a first user and the wearable projector device 91 of a second user. Conventional pairing techniques may be utilized in conjunction with step 301.

Optionally, at step 302, the user computer device 60 pairs with one or more remote secondary cameras 92. In embodiments, the communication module 67 of the user computer device 60 includes Bluetooth technology to pair with the one or more secondary cameras 92. The one or more secondary cameras 92 may be cameras on other personal devices of the user (smartphone, smartglasses, laptop camera, etc.). Conventional pairing techniques may be utilized in conjunction with step 302.

At step 303, the user computer device 60 displays content on the touch screen 61. It should be understood that the type and amount of content displayed by the user computer device 60 is not intended to be limited by the present invention. Content may include, for example, text, images, diagrams, symbols, etc. Conventional display techniques may be utilized in conjunction with step 303.

At step 304, the user computer device 60 detects an obstruction of content in one or more areas of the touch screen 61. As used herein, the term obstruction of content means that an obstructing object (e.g., finger, stylus, etc.) is between the touch screen 61 on which content is displayed, and one or more users viewing the content, such that a portion of the content is obstructed from the view of the one or more users. Situations in which a user's interactions with touch screen 61 may create an obstacle to viewing content may include: typing text on the touch screen 61 with a finger/stylus, entering numbers on the touch screen 61 with a finger/stylus, selecting menus with a finger/stylus, or navigating content with a finger/stylus. In embodiments, or more of a plurality of different detection methods are utilized alone or in combination in performing step 304. For example, the user computer device 60 may utilize sensor data received from one or more proximity sensors 62, one or more remote secondary cameras 92, a camera 63 of the user computer device 60, and/or a camera (e.g., 94, 97) of a wearable projector device 90, 91 (e.g., smartglasses) to detect obstruction of the content on the touch screen 61. Other types of sensing devices such as strain gauges, light sensors or other conventional sensing technology (not shown) may be utilized in the performance of step 304. In one example, the obstruction detection module 64 of the user computer device 60 receives sensor data from the proximity sensors 62 and data from the camera 63 to determine that a user's view of content displayed on the touch screen 61 is being obstructed by the user's fingers as they use the touch screen 61. In another example, the obstruction detection module 64 of the user computer device 60 receives sensor data from the proximity sensors 62 and data from the camera 63 to determine that content displayed on the touch screen 61 is being obstructed by a first user's hand as the first user uses the touch screen 61, and simultaneously by a second user's hand as the second user touches the touch screen 61. The manner in which the user computer device 60 detects an obstruction of content on the touch screen 61 is not intended to be limited by the examples given herein.

At step 305, the user computer device 60 determines obstructed content in one or more areas of the touch screen 61 based on the obstruction of the content detected at step 304. In aspects, the obstruction detection module 64 sends data related to the detecting of an obstruction of content in one or more areas of the touch screen 61 (obstruction data) to the content determination module 65, and the content determination module 65 utilizes the obstruction data and data regarding which content is being displayed on the touch screen 61 to determine the amount and type of content that is being obstructed in real time. Various methods of comparing unobstructed content to obstructed content to determine the content that is to be projected may be utilized in conjunction with step 305. In one example, as a user's finger is moved across a touch screen 61 and obscures content on the touch screen 61, the content determination module 65 determines the content that is being obstructed in the particular area of the touch screen 61 obstructed, in real time, utilizing sensor data from the proximity sensors 62 in combination with data regarding the overall content being displayed. In this way, the user computer device 60 can determine the portion of the overall content being displayed that is being obstructed by the users finger. In another example, as both a first user's finger and a second user's finger are moved across different portions of the touch screen 61, the content determination module 65 determines the content that is being obstructed in multiple particular areas of the touch screen 61, in real time. Although discussed as two separate steps, it should be understood that steps 304 and 305 may be performed simultaneously or nearly simultaneously in real time by the user computer device 60.

In embodiments of the invention, at step 306, the user computer device 60 determines a facial direction of each of the one or more users relative to the touch screen 61. As used herein, the term facial direction means an angle at which a user is viewing the content (and any obstruction) on the touch screen 61, or an angle of the viewer with respect to the contact surface of the touch screen 61. In embodiments, the user computer device 60 determines the facial direction of each of the one or more users using data received from the camera 63 of the user computer device 60. For example, in the case where the user computer device 60 is a smartphone, the smartphone's camera 60 may capture image data, which the perspective determination module 66 of the user computer device 60 may utilize to determine the facial direction for each user with respect to the touch screen 61. In aspects, step 306 is performed upon detection of the obstruction of the content at step 304. In an alternative embodiment, step 306 is performed on an ongoing bases, either continuously or periodically. In embodiments, the user computer device 60 also determines the number of users of the user computer device 60 using data received from a camera (e.g., 60, 63). Information regarding the facial direction for one or more users, and the number of users, may be stored in a database of the user computer device 60 or fed directly to the content determination module 65 for use in step 307.

At step 307, the user computer device 60 determines a display configuration for a portion of the obstructed content (some or all of the obstructed content) determined at step 305. In embodiments, the user computer device determines a display configuration for the portion of the obstructed content based on the facial direction of one or more user's determined at step 306. In aspects, the user computer device 60 determines a plurality of display configurations, one for each area of the touch screen 61 that is obstructed (e.g., by first and second users). In embodiments, the user computer device 60 determines the display configuration based in part on content display rules received at step 300. For example, the content display rules may indicate that only text-based data should be projected, in which case the display configuration may call for the reproduction and projection of only obstructed text (e.g., rather than obstructed images and text).

Figure 4:
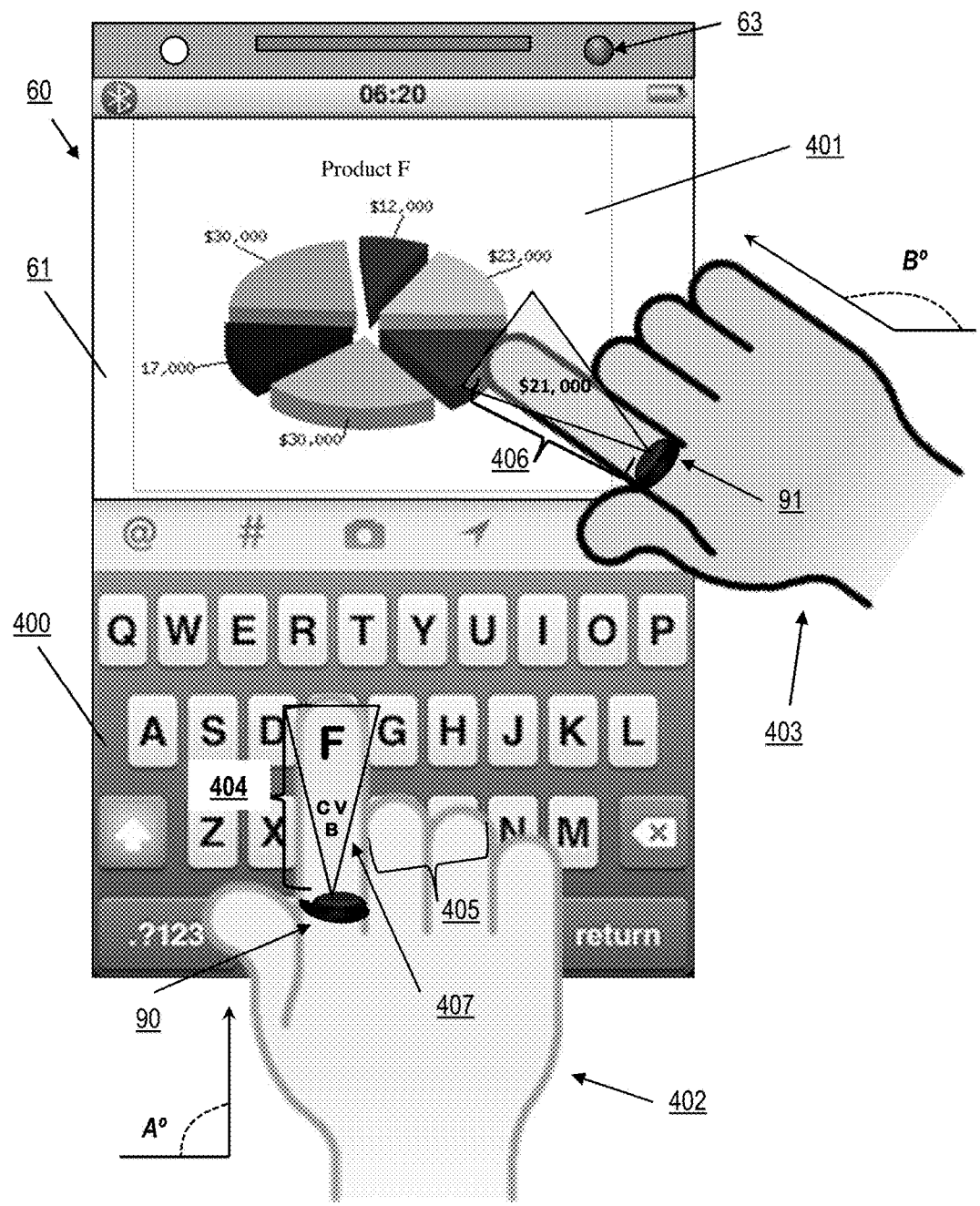
FIG. 4 illustrates an exemplary use scenario in accordance with embodiments of the invention.

In embodiments, the display configuration is a reproduction of the obstructed content determined at step 305. For example, if a user's finger is blocking the letter "V" on a touch screen keyboard, the display configuration for the obstructed content may be a replication of the letter "V" to be projected over the exact location of the letter "V" underlying the user's finger. In embodiments, the display configuration may be configured to adjust for various limitations of the image projector(s) being utilized (e.g., 93, 96). In aspects, the computer device 60 may determine that an amount of obstructed content cannot be projected by the wearable projector device 90 over at least a portion of an obstructed area, and therefore the determined display configuration includes a reformatted version of the underlying obstructed content. For example, if a user's hand is blocking the letter's "F", "C", "V", and "B", the display configuration may require shrinking the letters "C", "V", and "B" to fit over a particular portion of the obstructed content area, while displaying a replication of the letter "F" over the exact location of the underlying letter "F". This example is depicted in FIG. 4, which is described in more detail below.

Optionally, a plurality of wearable projector devices 90, 91 may be utilized in conjunction with one another (as collaborative devices) to display a desired amount of obstructed content over one or more objects causes the obstructions, in accordance with step 309. In this case, the user computer device 60 configures a plurality of display configurations in accordance with step 307. For example, wearable projector device 90 may be a ring projector with an image projector 93 installed around the circumference of the ring, wherein the image projector 93 has a limited projection range, and may be utilized in conjunction with wearable projector device 91 in the form of smartglasses that have a greater projection range. In such a scenario, the user computer device 60 generates a first display configuration to cause a portion of obstructed content to be projected over an obstructed content area utilizing the ring projector, and generates a second display configuration to cause another portion of the obstructed content to be projected over another obstructed content area utilizing the smartglasses. In embodiments, the user computer device 60 determines that a second user is attempting to view content obscured by the finger of a first user, and adjusts the display configuration such that a projection of a portion of the obstructed content over the first user's finger is from the perspective of the second user.

At step 308, the user computer device 60 sends the display configuration(s) determined at step 307 to at least one wearable projector device 90, 91. In embodiments, the display configuration(s) comprises data defining the manner in which a portion of the obstructed content determined at step 305 is to be projected over one or more areas of the touch screen 61. In aspects, the communication module 67 of the user computer device 60 sends the display configuration to the communication module 95, 98 of one or more wearable projector devices 90, 91.

At step 309, the one or more image projectors 93, 96 of the at least one wearable projector device 90, 91 project obstructed content over the one or more obstructed areas of the touch screen 61 and the object(s) of obstruction (e.g., first and second user's fingers). In embodiments, content projected over a finger of a user by the one or more image projectors 93, 96 changes dynamically based on movement of the finger around the content displayed on the touch screen 61, facial direction alignment of the user, and change in content on the display device. In embodiments, the one or more image projectors 93, 96 project obstructed content over multiple obstructed areas of the touch screen 61 in real time. In aspects, the one or more image projectors 93 and 96 are micro or pico projectors. It should be understood that different micro or pico projectors may be utilized in accordance with the method of FIG. 3. In aspects, the image projector 93, 96 is part of a ring, smartwatch, smartglasses or other smart wearable device that projects obstructed content over one or more obstructed areas of the touch screen 61 (and the objects obstructing the content) in accordance with the display configuration received from the user computer device 60. Advantageously, only obstructed content is projected over the one or more objects obstructing the content, as opposed to conventional projectors that project entire packages of content onto a screen or other object for viewing by a user.

FIG. 4 depicts an exemplary use case for embodiments of the invention. In the scenario of FIG. 4, the user computer device 60 is in the form of a mobile device including the touch screen 61 and the camera 63. Steps of the scenario of FIG. 4 may be performed in the environment illustrated in FIG. 2 and in conjunction with the method of FIG. 3.

As depicted, the touch screen 61 is configured to display content, which is shown in this example as a touch screen keyboard 400 and a chart 401 for "Product F". A first user indicated at 402 utilizes the wearable projector device 90 in the form of a ring projector. A second user indicated at 403 utilizes the wearable projector device 91 in the form of a ring projector. Initially, the user computer device 60 pairs with both wearable projector devices 90 and 91 (e.g., through Bluetooth) in accordance with step 301 of FIG. 3. The user computer device 60 also displays content (400 and 401) on the touch screen 61 in accordance with step 303 of FIG. 3. The user computer device 60 detects an obstruction of content in multiple areas of the touch screen 61 generally represented at 404-406, utilizing internal proximity sensors 62 (not shown in FIG. 4), in accordance with step 304 of FIG. 3. The user computer device 60 then determines obstructed content in the areas 404, 405 and 406 in accordance with step 305 of FIG. 3.

In the scenario of FIG. 4, the user computer device 60 determines that the hand of the first user 402 is obstructing portions of the touch screen keyboard 400, including the letters "F", C", "V" and "B" at areas 404 and 405. The user computer device 60 also determines that the hand of the second user 403 is obstructing portions of the chart 401, including the text "$21,000" at area 406. The user computer device 60 also determines a respective facial direction of each of the first and second users 402 and 403 utilizing the camera 63, in accordance with step 306 of FIG. 3. In this scenario, the user computer device 60 determines that the first user 402 is viewing the touch screen 61 at a first angle represented at A°, and that the second user 403 is viewing the touch screen 61 at a second angle represented at B°.

The user computer device 60 then determines the display configuration for obscured content in the areas 404 and 405, and the display configuration for the obscured content in the separate area 406, in accordance with step 307 of FIG. 4. In the scenario of FIG. 4, the content display rules stored in the user computer device 60 (received in accordance with step 300 of FIG. 3) limit the content to be displayed to text-based content, such that decorative borders and graphics are not to be projected by wearable projector devices 90 and 91 in communication with the user computer device 60. Thus, the user computer device 60 determines the respective display configurations for obscured text-based content in the areas 404, 405 and 406 of the touch screen 61. Moreover, the user computer device 60 determines the respective display configurations based on the facial directions of the first and second users 402 and 403. The user computer device 60 then sends the display configurations to respective wearable projector devices 90 and 91 in accordance with step 308 of FIG. 3.

Still referencing FIG. 4, the wearable projector device 90 receives the display configuration and projects obstructed content onto the finger of the first user 402 using the image projector 93 (not separately labeled in FIG. 4). In this scenario, the projected content includes the letters "F", "C", "V", and "B". Additionally, in this scenario, the user computer device 60 determines that a portion of the obstructed content ("V" and "B") cannot be projected by the wearable projector device 90 over an area 405. Accordingly, the user computer device 60 determined that the display configuration includes letter "C", "V", and "B" shrunk and repositioned on an available projector display area represented at 407. Thus, based on the display configuration determined by the user computer device 60, the wearable projector device 90 projects the obstructed content "F", "C", "V", and "B" in a format that enables the user to understand the text-based content that is obstructed by their hand. Similarly, the wearable projector device 91 receives the display configuration and projects obstructed content onto the finger of the second user 403 using the image projector 96 (not separately labeled in FIG. 4). In this scenario, the projected content includes the text "$21,000", which is obscured by the finger of the second user 403. Thus, it can be understood that a portion of the obstructed content (the text-based content "F", "C", "V", and "B") is displayed over a finger (finger of first user 402) causing the obstruction of the content, while another portion of obstructed content (the text-based content "$21,000") is displayed over a finger (finger of second user 403) causing the obstruction of another portion of content.

Advantageously, embodiments of the invention enable the projection of only obstructed content (rather than large amounts of projected content) over the top surface of one or more objects (e.g., user's finger or stylus) obstructing the view of a touch screen. In this way, aspects of the invention enable uninterrupted interaction with the touch screen, in single user or multi-user scenarios.

In embodiments, a service provider could offer to perform the processes described herein. In this case, the service provider can create, maintain, deploy, support, etc., the computer infrastructure that performs the process steps of the invention for one or more customers. These customers may be, for example, any business that uses touch screen technology. In return, the service provider can receive payment from the customer(s) under a subscription and/or fee agreement and/or the service provider can receive payment from the sale of advertising content to one or more third parties.

In still another embodiment, the invention provides a computer-implemented method for detecting and projecting obstructed content over touch screen obstructions. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for projecting obstructed content over touch screen obstructions by a wearable projector device comprising:

receiving, by a wearable projector device, display configuration information from a remote computing device, wherein the display configuration information defines a manner in which a portion of content on a touchscreen, obstructed from a user's view by an obstructing object, is to be projected by the wearable projector device; and projecting, by the wearable projector device, obstructed content over the obstructing object based on the portion of content on the touchscreen obstructed from the user's view, wherein the obstructed content changes dynamically based on movement of the obstructing object in real time.

2. The method of claim 1, further comprising:
  detecting, by the wearable projector device, the portion of content on the touchscreen obstructed from the user's view to generate obstruction of content data; and
  sending, by the wearable projector device, the obstruction of content data to the remote computing device.

3. The method of claim 2, wherein the detecting the portion of content on the touchscreen obstructed from the user's view is performed by a camera of the wearable projector device.

4. The method of claim 1, wherein the wearable projector device is selected from the group consisting of: a ring, a smartwatch, and smartglasses.

5. The method of claim 1, further comprising wirelessly pairing the wearable projector device with the remote computing device.

6. The method of claim 1, wherein the display configuration information is based on data regarding the user's facial direction, and the obstructed content is projected over the obstructing object based on the data regarding the user's facial direction.

7. The method of claim 1, wherein the obstructed content projected over the obstructing object comprises a reformatted version of the portion of content on the touchscreen obstructed from the user's view, wherein the reformatted version is different from an original version of the portion of content on the touchscreen obstructed from the user's view.

8. The method of claim 1, wherein the projecting the obstructed content over the obstructing object is performed by a pico-projector of the wearable projector device.

9. A computer program product for projecting obstructed content over touch screen obstructions, the computer program product comprising a computer readable storage medium having program instructions embodied therewith, the program instructions executable by a wearable projector device to cause the wearable projector device to:
  receive a display configuration from a remote computing device, wherein the display configuration defines a manner in which a portion of content on a touchscreen, obstructed from a user's view by an obstructing object, is to be projected by the wearable projector device; and
  project the portion of the content obstructed over the obstructing object, wherein the portion of content projected changes dynamically based on movement of the obstructing object in real time.

10. The computer program product of claim 9, wherein the program instructions further cause the wearable projector device to:
  detect the portion of content on the touchscreen obstructed from the user's view to generate obstruction of content data; and
  send the obstruction of content data to the remote computing device.

11. The computer program product of claim 9, wherein the detecting the portion of content on the touchscreen obstructed from the user's view is performed by a camera of the wearable projector device.

12. The computer program product of claim 10, wherein the wearable projector device is selected from the group consisting of: a ring, a smartwatch, and smartglasses.

13. The computer program product of claim 9, wherein the program instructions further cause the wearable projector device to: wirelessly pair with the remote computing device.

14. The computer program product of claim 9, wherein the display configuration is based on facial direction data regarding a facial direction of the user.

15. The computer program product of claim 9, wherein the display configuration comprises a reformatted version of the portion of content on the touchscreen obstructed from the user's view, wherein the reformatted version is different from an original version of the portion of content on the touchscreen obstructed from the user's view.

16. The computer program product of claim 9, wherein the projecting the portion of the content obstructed over the obstructing object is performed by a pico-projector of the wearable projector device.

17. A system for detecting and projecting obstructed content over touch screen obstructions, comprising:
  a CPU, a computer readable memory and a computer readable storage medium associated with a computing device;
  program instructions stored on the computer readable storage medium for execution by the CPU via the computer readable memory, the program instructions of the computing device including:
    program instructions to display content on a touch screen of the computing device;
    program instructions to detect an obstruction of the content on an area of the touch screen by an obstructing object, wherein the user's view of the content is obstructed;
    program instructions to determine obstructed content in the area of the touch screen;
    program instructions to determine a display configuration for a portion of the obstructed content, wherein the display configuration defines a manner in which the portion of the obstructed content is to be projected by a wearable projector device; and
    program instructions to send the display configuration to the wearable projector device;
  a wearable projector device including a communications module;
  program instructions stored in the communications module of the wearable projector device for execution by the wearable projector device, the program instructions of the computing device including:
    program instructions to receive the display configuration from the CPU; and
    program instructions to project the portion of the obstructed content over the obstructing object.

18. The system of claim 17, further comprising program instructions stored in the computer readable storage medium to determine a facial direction of the user relative to the touch screen, wherein the CPU utilizes the facial direction in determining the display configuration.

19. The system of claim 17, further comprising program instructions stored in the computer readable storage medium of the CPU to:
  pair the CPU with one or more remote cameras; and
  detect, in real time, the obstruction of the content on the area of the touch screen utilizing data from the one or more remote cameras to detect the obstructed content.

20. The system of claim 17, wherein the wearable projector device is selected from the group consisting of a ring, a watch and glasses.

* * * * *